March 28, 1944.  K. R. HERMAN ET AL  2,345,475
ACCUMULATOR
Filed March 11, 1942
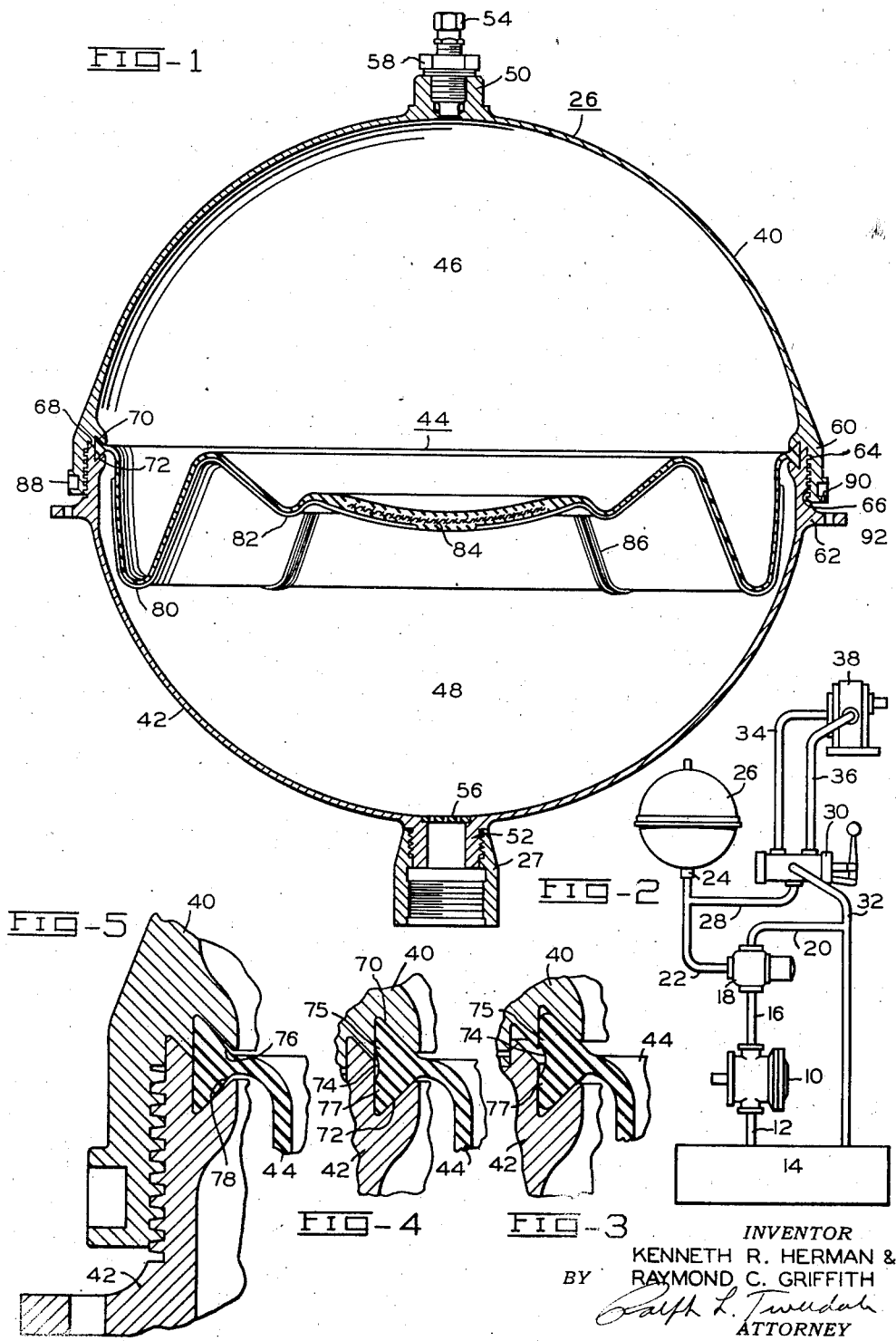
INVENTOR
KENNETH R. HERMAN &
BY  RAYMOND C. GRIFFITH
Ralph L. Tweedale
ATTORNEY Patented Mar. 28, 1944

2,345,475

UNITED STATES PATENT OFFICE 2,345,475

ACCUMULATOR

Kenneth R. Herman, Franklin, and Raymond C. Griffith, Detroit, Mich., assignors to Vickers Incorporated, Detroit, Mich., a corporation of Michigan Application March 11, 1942, Serial No. 434,160

2 Claims. (Cl. 138—30)

This invention relates to power transmissions, particularly to those of the type comprising two or more fluid pressure energy translating devices, one of which may function as a pump and another as a fluid motor.

The invention is more particularly concerned with the construction of hydraulic accumulators used in such systems and especially to those adapted for use on aircraft where high performance and light weight are important requirements.

In accumulators as formerly constructed for this class of service a common construction has utilized two generally hemispherical shells joined together with a flexible diaphragm clamped therebetween to form a gas chamber and a liquid chamber. Considerable difficulties have been encountered in designing a satisfactory screw-threaded joint for these accumulators which will insure a tight seal capable of withstanding high fluid pressures of the order of one to two thousand pounds per square inch and at the same time to utilize an absolute minimum thickness of metal so as to have as light weight construction as possible.

It is an object of the present invention to provide an improved accumulator of the type above mentioned wherein a better sealing engagement of the two shells and the diaphragm is effected with less weight of metal than has hitherto been possible.

It is also an object to provide an improved diaphragm and sealing means therefor which is better adapted to withstand the strains of extreme flexure thereof without loosening and which may be assembled easily and with certainty of correct assembly.

A further object is to provide a sealing means for such a diaphragm which is placed under initial compression, locally, when the accumulator is assembled and which is exposed to the internal operating fluid pressure in such a way as to automatically tighten as such pressure increases.

Further objects and advantages of the present invention will be apparent from the following description, reference being had to the accompanying drawing wherein a preferred form of the present invention is clearly shown.

In the drawing:

Figure 1 is a cross section of an accumulator embodying a preferred form of the present invention.

Figure 2 is a diagrammatic view of a power transmission system including the accumulator of Figure 1.

Figures 3, 4 and 5 are fragmentary views of the rim portions of the accumulator of Figure 1 showing various stages of assembling the sealing means.

Referring now to Figure 2, there is shown diagrammatically a conventional power transmission system including a pump 10 adapted to be driven by any suitable prime mover, not shown. The pump 10 has a suction conduit 12 for withdrawing liquid from a tank 14 and a delivery conduit 16. The latter incorporates a pressure-responsive unloading valve 18 which acts to bypass the full pump delivery to the tank at negligible pressure through a bypass conduit 20 and, at the same time, maintains a back pressure in conduit 22 which leads to a liquid connection 24 of an air-loaded accumulator 26.

Conduit 22 has a branch conduit 28 which extends to a conventional four-way reverse valve 30. The latter has a tank conduit 32 and cylinder conduits 34 and 36 leading to a fluid motor 38 of conventional construction and which may be connected to drive any suitable load device. The above-described circuit is typical of the class of power transmission circuits with which the accumulator of the present invention is particularly adapted for use.

Referring now to Figure 1, the accumulator comprises two generally hemispherical cups 40 and 42 arranged to provide a generally spherical closed chamber. Clamped between the two cups is a flexible diaphragm 44 which divides the spherical chamber into an upper air chamber 46 and a lower liquid chamber 48. Suitable connection bosses are provided at 50 and 52, the former being an air-inlet connection to which a suitable check valve 54 may be connected for initially charging the chamber 46 with air pressure, and the latter being a liquid connection provided with an adapter 27. A perforated disk 56 is preferably provided at the inner end of the liquid connection and an air-fitting 58 is arranged to be in continuity with the spherical radius of the inner end of the air chamber so as to prevent undue distortion of the diaphragm 44 should either the liquid or air chamber become completely empty.

The two hemispheres 40 and 42 are provided with thickened rim portions 60 and 62, respectively, the former having an internal screw thread formed at 64 and the latter having an external screw thread formed at 66. The rim 60 is also provided with a shoulder at 68 which abuts against the edge of the threaded portion of rim 62. Rims 60 and 62 are provided with an annular recess 70 and 72, respectively, which receives the periphery of the diaphragm 44. This periphery is formed as shown in the drawing in a somewhat triangular shape in cross section, and, due to the flexible nature of the material of which the diaphragm 44 is formed, it acts to automatically seal the joint between the two cups 40 and 42 against any pressure. As shown in Figure 3, the diaphragm 44 is provided with an annular recess 74 on the center of the outer edge of its periphery and/or on either side thereof with a pair of humps 76 and 77 to prevent the pinching of the edge when cups 40 and 42 are in their assembled position, as shown in Figure 4. It will be seen in Figure 5 that leakage is prevented under any pressure, that is, the higher the pressure, the tighter the seal becomes, being pushed tighter against the outer wall of the annular recesses 70 and 72. Figure 5 shows the aforesaid reaction of the sealing means, illustrating the indentations formed at 76 and 78 by the high pressure and the absence of the recess 74.

The diaphragm 44 is preferably formed of a flexible oil-resistant material, for example, synthetic rubber known to the trade as "neoprene." For the purpose of separating the air from the oil, regardless of the relative volumes of fluid within the accumulator 26, the diaphragm is provided with annular corrugations 80 and 82 of varying depth. The central portion of the diaphragm 44 is made significantly thicker than the remainder thereof and is provided with a fabric reinforcing disk 84. The lower face of the diaphragm 44 is provided with a plurality of pairs of radial ribs 86 so as to prevent, when the diaphragm 44 is pressed against the full surface of the oil chamber 52, the trapping of oil therebetween by allowing it to escape through the grooves formed by the ribs 86.

The rim 60 may be provided with holes 88 suitably spaced around its periphery for the reception of a spanner tool for screwing and unscrewing the cups. One pair of such holes is provided with small cross bores 90 through which a safety wire may be threaded and fastened to the holes 92 on the extended portion of rim 62 to prevent accidental loosening of the threaded joint.

In operation of the accumulator, liquid under pressure is stored in the oil chamber 48 to a maximum pressure determined by the unloading valve 18. Air or other suitable elastic fluid under the same pressure is stored in chamber 46 and acts to maintain pressure on the liquid in chamber 48. This pressure, while not absolutely constant, may nevertheless be sufficient at all times to provide the necessary operating pressure for the motor 38. The volume stored in the liquid chamber 48 serves to augment the pump delivery during periods of high consumption at the motor 38, while the volume is replenished during periods of lower consumption.

When the accumulator becomes filled to a substantial volume of liquid, the rising pressure in both chambers actuates the unloading valve 18 to discontinue further delivery by the pump until such time as the supply of liquid in chamber 48 is depleted to the point where the unloading valve 18 again directs the pump delivery into service.

It will be noted that the walls of the two hemispheres 40 and 42 are not truly spherical throughout their full extent but include a portion near the rims 60 and 62 which is conical in shape. The forces set up by the pressure within the accumulator 26 tend to separate the two hemispheres 40 and 42 and are transmitted to the rims 60 and 62 along lines of action which are coincident with the section axis of the conical portions of the hemisphere walls. The lines of action are the mean radii of the respective hemispheres. Preferably the angle of these conical portions and the point at which they join the rim portions 60 and 62 are such that the aforesaid mean radii intersect at or near the pitch line of the threads 64 and 66 when extended thereto. Thus, in this way there is avoided the setting up of any bending stresses which tend to bend the rim portion 60 and/or 62 in directions or a direction which would separate the two hemispheres.

While the form of embodiment of the invention as herein disclosed constitutes a preferred form, it is to be understood that other forms might be adopted, all coming within the scope of the claims which follow.

What is claimed is as follows:

1. A fluid pressure accumulator comprising two hemispherical cups and a flexible diaphragm assembled together to provide fluid-tight liquid and gas chambers on opposite sides of the diaphragm, said shells being formed, each with an annular V-shaped groove along its inside edge and in register with the groove of the other member, to provide a recess of generally triangular cross-section with its base lying in a cylindrical surface at the outside of said recess, a part of said base lying within each shell, whereby a crack is formed between the shells and adjacent said recess until the shells are finally drawn into assembled relation, and a sealing ring formed on the periphery of the diaphragm of a volume sufficient to substantially fill the recess after final assembly and being shaped so as to be distorted in the process of assembly in a manner to keep the sealing ring from being pinched in said crack.

2. A fluid pressure accumulator comprising two hemispherical cups and a flexible diaphragm assembled together to provide fluid-tight liquid and gas chambers on opposite sides of the diaphragm, said shells being formed to provide a recess of generally triangular cross-section with its base lying in a cylindrical surface at the outside of said recess, and a sealing ring formed on the periphery of the diaphragm, said ring having a volume sufficient to substantially fill but insufficient to become clamped in the recess after final assembly but of a shape slightly varying from the shape of the recess whereby the ring will be distorted in the process of assembly to set up localized pressure contacts between ring and recess effective to seal at low pressures in the accumulator and being further distorted by the application of high pressure in the accumulator to more tightly wedge the ring into corners of and against the outer wall of the recess.

KENNETH R. HERMAN.
RAYMOND C. GRIFFITH.